US012779419B2

(12) United States Patent
Lazzarini et al.

(10) Patent No.: US 12,779,419 B2
(45) Date of Patent: Nov. 3, 2026

(54) MACHINE FOR PROCESSING LIQUID OR SEMI-LIQUID FOOD PRODUCTS AND METHOD FOR PROCESSING LIQUID OR SEMI-LIQUID FOOD PRODUCTS

(71) Applicant: ALI GROUP S.R.L.—CARPIGIANI, Cernusco Sul Naviglio (IT)

(72) Inventors: Roberto Lazzarini, Reggio Emilia (IT); Federico Tassi, Bologna (IT)

(73) Assignee: ALI GROUP S.R.L.— CARPIGIANI, Cernusco Sul Naviglio (IT)

( * ) Notice: Subject to any disclaimer, the term of this patent is extended or adjusted under 35 U.S.C. 154(b) by 828 days.

(21) Appl. No.: 18/153,101

(22) Filed: Jan. 11, 2023

(65) Prior Publication Data

US 2023/0234011 A1 Jul. 27, 2023

(30) Foreign Application Priority Data

Jan. 26, 2022 (IT) ........................ 102022000001304

(51) Int. Cl.

*B01F 35/95* (2022.01)
*A47J 27/00* (2006.01)
*A47J 36/24* (2006.01)
*A47J 36/32* (2006.01)
*B01F 27/60* (2022.01)

(Continued)

(52) U.S. Cl.

CPC ............. *B01F 35/95* (2022.01); *A47J 27/002* (2013.01); *A47J 27/004* (2013.01); (Continued)

(58) Field of Classification Search

CPC ...... A47J 36/32; A47J 36/2483; A47J 27/004; A47J 27/002; A23G 9/305; A23G 9/281; (Continued)

(56) References Cited

U.S. PATENT DOCUMENTS

2013/0344204 A1 12/2013 Goodson
2015/0342413 A1* 12/2015 Joao ...................... A47J 27/004 426/523

(Continued)

FOREIGN PATENT DOCUMENTS

CN 206715846 U 12/2017
CN 107847084 A 3/2018

(Continued)

OTHER PUBLICATIONS

European Office Action dated Apr. 29, 2024 from counterpart European Patent Application No. 23152717.7.

(Continued)

*Primary Examiner* — Brian W Jennison

(74) *Attorney, Agent, or Firm* — SHUTTLEWORTH & INGERSOLL, PLC; Timothy J. Klima

(57) ABSTRACT

A machine for processing liquid or semi-liquid food products, comprising: a container for processing liquid or semi-liquid food products and provided with walls and an outlet; a stirrer, made at least partly from ferromagnetic material and disposed inside the processing container, the stirrer rotating about a mixing axis to mix the product to be dispensed;

an actuator connected to the stirrer to set the stirrer in rotation about the mixing axis, the machine being characterized in that it comprises an induction element comprising one or more wound conductors for generating a magnetic field when an electric current flows through them, the induction element being disposed outside the processing container so that the magnetic field generated passes through at least part of the walls of the processing container to reach the stirrer and causes heating by magnetic induction.

16 Claims, 4 Drawing Sheets

(51) Int. Cl.

| | |
|---|---|
| ***B01F 35/90*** | (2022.01) |
| ***B01F 101/06*** | (2022.01) |
| ***H05B 6/12*** | (2006.01) |

(52) U.S. Cl.
CPC ........... *A47J 36/2483* (2013.01); *A47J 36/32* (2013.01); *B01F 27/60* (2022.01); *H05B 6/12* (2013.01); *B01F 2035/99* (2022.01); *B01F 2101/06* (2022.01)

(58) Field of Classification Search
CPC . A23G 9/224; A23G 9/22; A23G 9/12; A23G 3/0226; A23G 3/001; A23G 3/0014; A23G 3/0215; A23L 5/21; A23L 5/15; A23P 30/00; A23P 30/40; B01F 27/70; B01F 27/60; B01F 27/90; B01F 2101/06; B01F 2035/99
See application file for complete search history.

(56) References Cited

U.S. PATENT DOCUMENTS

| | | | | |
|---|---|---|---|---|
| 2017/0332659 | A1* | 11/2017 | Cocchi | ..................... A23G 9/12 |
| 2018/0064281 | A1* | 3/2018 | Collins | ..................... A23L 5/15 |
| 2019/0239533 | A1 | 8/2019 | Cocchi | |
| 2020/0060318 | A1 | 2/2020 | Fabozzi | |

FOREIGN PATENT DOCUMENTS

| | | | |
|---|---|---|---|
| CN | 112601605 | A | 4/2021 |
| EP | 1787944 | A1 | 5/2007 |
| EP | 3718409 | A1 | 10/2020 |
| IT | UA20162706 | A1 | 10/2017 |
| WO | 2014075923 | A1 | 5/2014 |

OTHER PUBLICATIONS

Italian Search Report dated Aug. 17, 2022 from counterpart Italian Patent Application No. 102022000001304.

Chinese Office Action dated Feb. 9, 2026 from application No. 202310101255.6.

Ruan Xinbo, Power Electronics, Series of Premium Electrical Engineering Textbooks, Key Textbooks for Jiangsu Province Higher Education Institutions (13th Five-Year Plan), China Machine Press, Jun. 2021, pp. 293-297.

* cited by examiner

MACHINE FOR PROCESSING LIQUID OR SEMI-LIQUID FOOD PRODUCTS AND METHOD FOR PROCESSING LIQUID OR SEMI-LIQUID FOOD PRODUCTS

This application claims priority to Italian Patent Application 102022000001304 filed Jan. 26, 2022, the entirety of which is incorporated by reference herein.

BACKGROUND OF THE INVENTION

This invention relates to a machine for processing liquid or semi-liquid food products (in particular, thermally) and to a method for thermally processing a base food mixture in the machine.

This invention relates, in particular, to an apparatus such as a pasteurizer, a cooker or a multifunction/combination machine which can perform both pasteurization and creaming in the same container, etc.

Prior art machines comprise a product containing element in which the mixture to be processed is placed and set in rotation by a stirrer.

These machines also comprise a thermodynamic system integrated in the machine to allow thermally processing the product to be dispensed.

Generally speaking, thermodynamic systems comprise a closed circuit (provided with different thermodynamic elements) in which a heat exchanger fluid circulates in order to exchange heat with the container so as to heat the container and thus allow the product to be thermally processed.

Disadvantageously, prior art machines provided with thermodynamic systems are not particularly efficient in that they require a large amount of energy to obtain the heat necessary for thermally processing the product.

Moreover, these thermodynamic systems are not easy to adjust and the machines are therefore not very flexible with respect to products of different kinds, which require specific processes according to predetermined heating curves.

There is therefore a need to thermally process liquid or semi-liquid food products, in particular by heating, in a more energy-efficient manner, so as to reduce the environmental impact of the process.

AIM OF THE INVENTION

The aim of this invention is to meet at least the above mentioned need by providing a machine for processing liquid or semi-liquid food products, capable of thermally processing the food product in a particularly efficient manner, and a method for processing food in the machine.

BRIEF DESCRIPTION OF THE DRAWINGS

The technical features of the invention, with reference to the above aim, are clearly described in the claims below and its advantages are apparent from the detailed description which follows, with reference to the accompanying drawings which illustrate an exemplary, hence non-limiting embodiment of the invention and in which:

DESCRIPTION OF THE PREFERRED EMBODIMENTS

Figure 1:
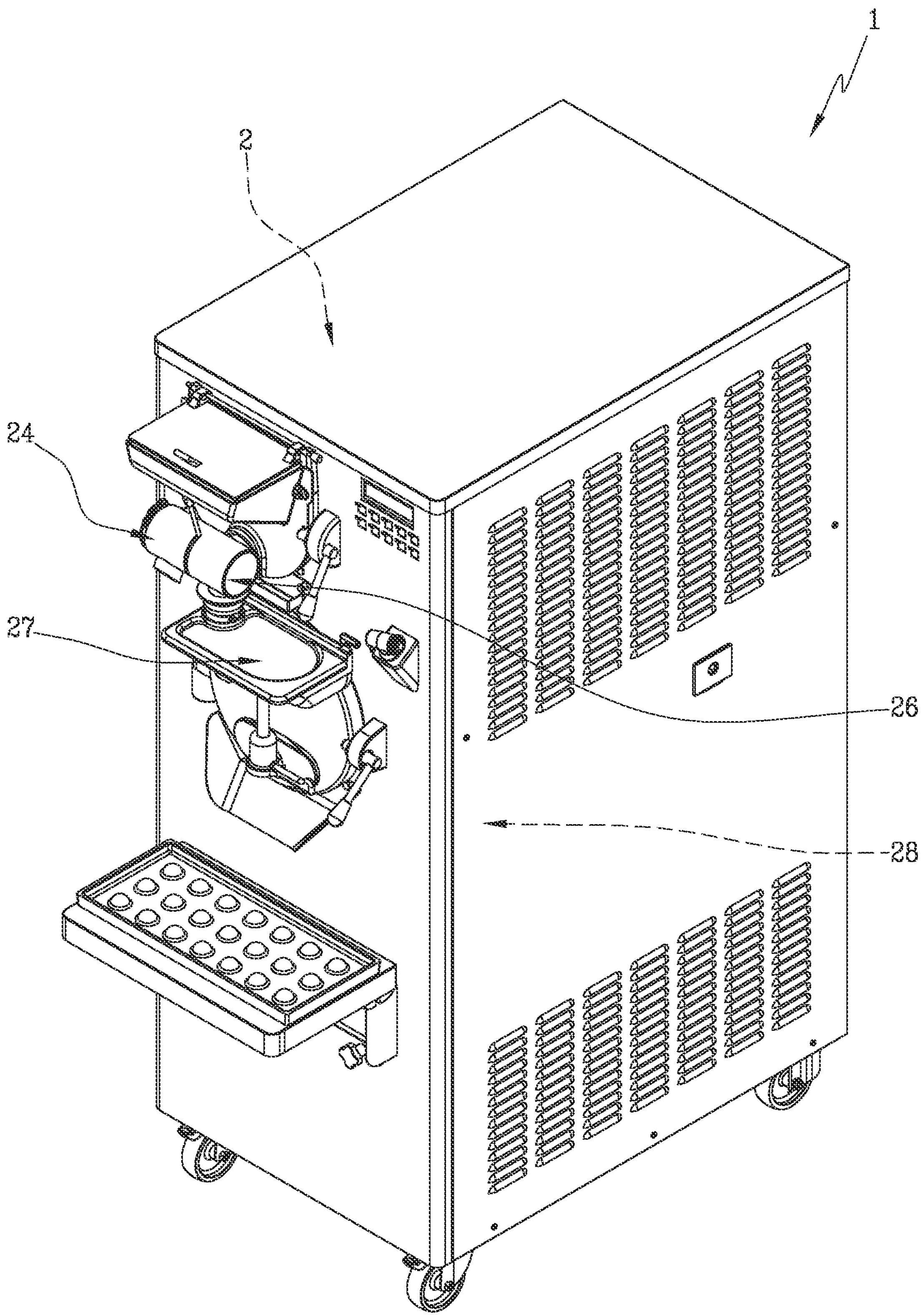
FIG. 1 shows a perspective view of a machine for processing liquid or semi-liquid food products according to this disclosure.

With reference to the accompanying drawings, the numeral 1 denotes a machine for making and dispensing liquid or semi-liquid food products according to this invention.

The machine 1 allows making different kinds of liquid or semi-liquid products such as, for example, bakery and confectionery products, creams, soups and the like.

The machine 1 comprises a container 2 for thermally processing liquid or semi-liquid food products and provided with walls 2A, 2B and an outlet 3.

The machine 1 may be, for example, a pasteurizer, a cooker, or a multifunction/combination machine which can perform both pasteurization and creaming in the same container 2.

Advantageously, the thermal processes facilitate the storage and safety of the processed foods by reducing oxidation of the end product.

The machine 1 comprises a dispenser 14 for dispensing the processed product.

The dispenser 14 is connected to the outlet 3 and is provided with a closing element (not illustrated) which is movable to open or close the outlet 3 when the product needs to be dispensed.

After undergoing the necessary thermal processes in the container 2, the product passes through the outlet 3 and can be dispensed through the dispenser 24.

Figure 2:
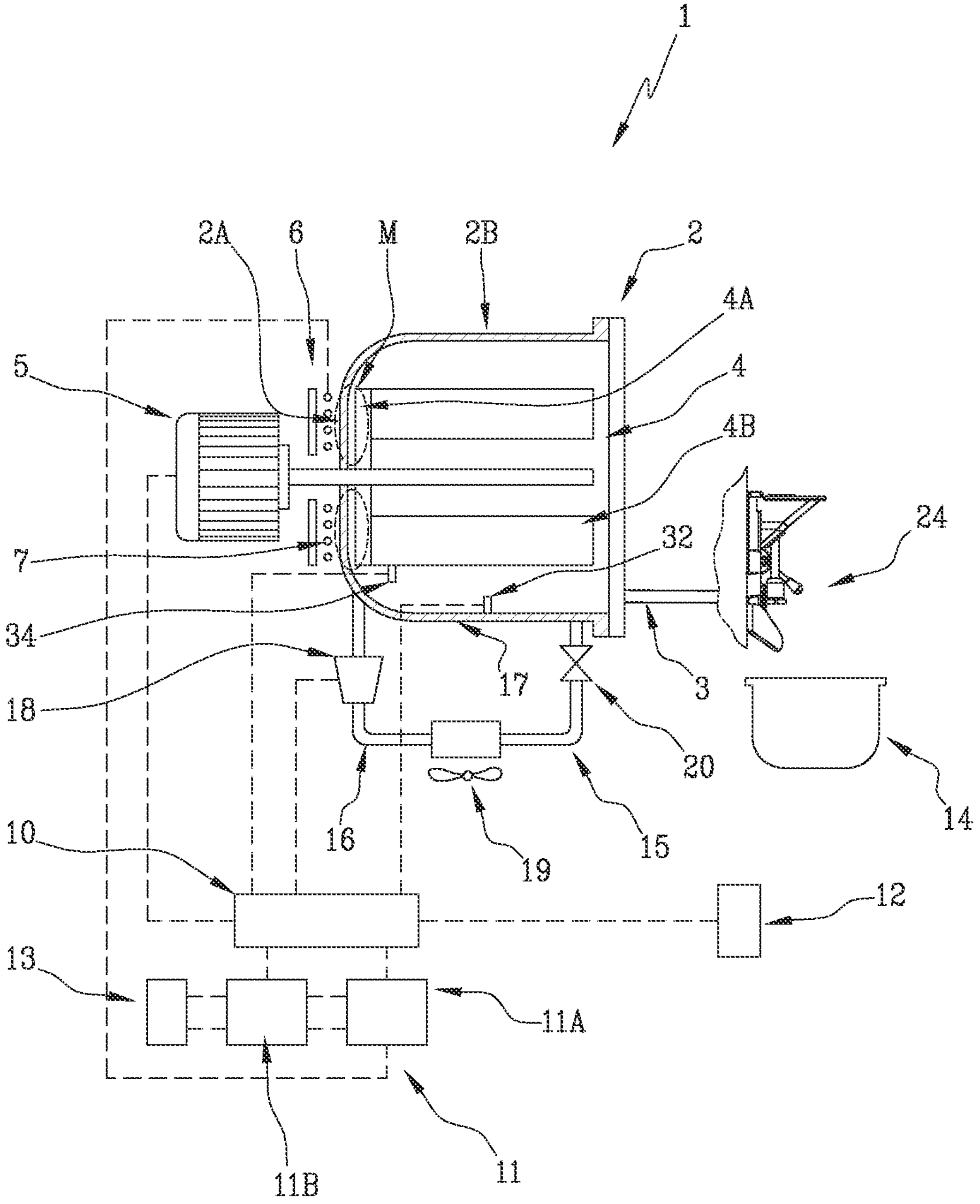
FIG. 2 schematically illustrates a first embodiment of an operating circuit applicable to the machine of FIG. 1.
Figure 3:
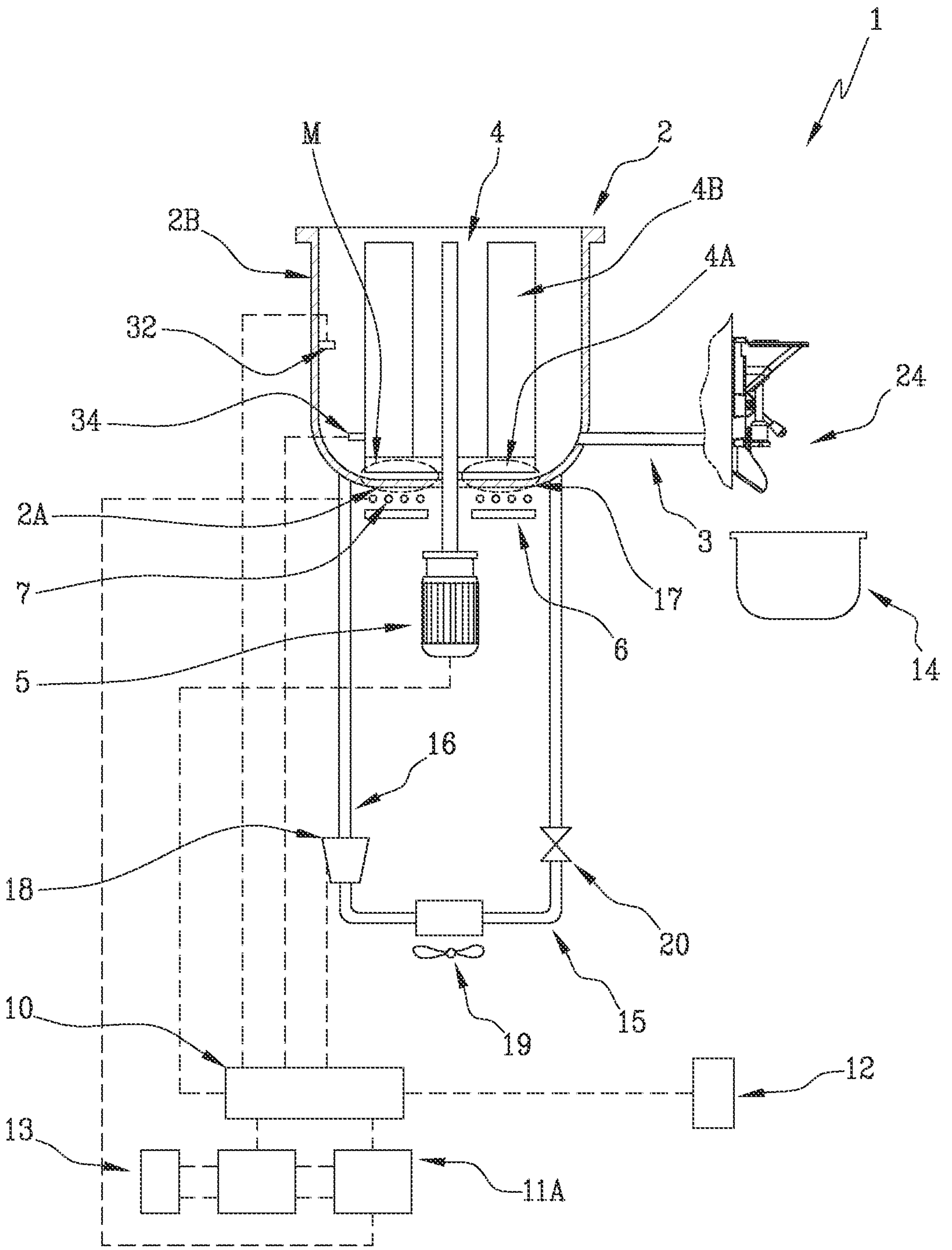
FIG. 3 schematically illustrates a second embodiment of an operating circuit applicable to the machine of FIG. 1.
Figure 4:
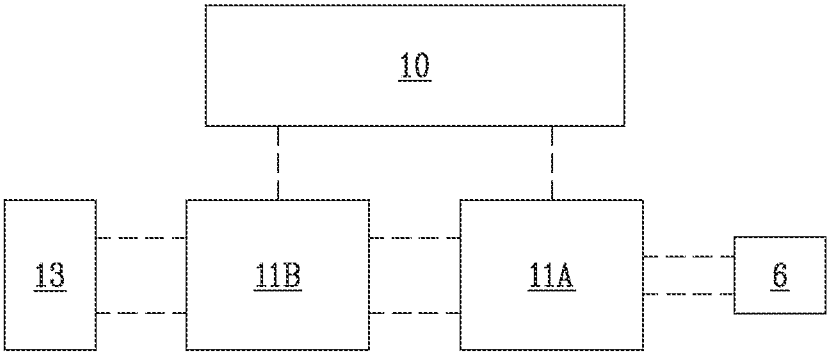
FIG. 4 schematically represents a part of the operating circuit of FIG. 2 or 3.

Preferably, the end product is then collected in a tub 14, as illustrated in FIG. 2 or 3.

In an embodiment, illustrated in FIG. 1, the machine 1 comprises a second container 28, in communication with the container 2 (the containers 2 and 28 are indicated by dashed arrows because they are hidden from view, inside the machine).

For example, the container 2 may be a cooker and the second container 28, a creaming cylinder.

The container 2 and the second container 28 are oriented preferably, but not necessarily, in the same way so as to ensure the compactness of the machine 1.

It should, however, be noted that the container 2, as illustrated in FIGS. 2 and 3, may have a main direction of extension that is horizontal or vertical.

In the case where both the container 2 and the second container 28 are present, the machine may comprise a dispenser 26 configured for pouring the contents of the container 2 into a hopper 27 leading into the second container 28.

The dispenser 24 and the dispenser 26 comprise respective closing elements, independent of each other (to start or stop dispensing).

The machine 1 comprises a stirrer 4, made at least partly from ferromagnetic material, disposed inside the container 2, and rotating about a mixing axis A to mix the product to be dispensed.

The machine 1 comprises an actuator 5 connected to the stirrer 4 to set the stirrer 4 in rotation about the mixing axis A.

Preferably, the actuator 5 is an electric motor.

The stirrer 4 comprises a first portion 4A which is made from a first, ferromagnetic material.

Advantageously, ferromagnetic materials can be easily magnetized when subjected to a magnetic field.

In an embodiment, the first portion 4A is made at least partly from ferritic steel.

In an embodiment, the first portion 4A has an austenitic steel coating (which allows increasing the hygiene of the stirrer 4 and improving its durability and ease of cleaning.

The stirrer 4 comprises a second portion 4B made from a material different from the first ferromagnetic material (for example, from a different metal).

The machine 1 is characterized in that it comprises an induction element 6.

The induction element 6 comprises one or more wound conductors 7 for generating a magnetic field M when an electric current flows through them.

The induction element 6 is disposed outside the processing container 2 so that the magnetic field M generated passes through at least part of the walls 2A, 2B of the processing container 2 to reach the stirrer 4 so as to heat the stirrer 4 by magnetic induction.

Advantageously, heating by magnetic induction allows creating thermal processes of shorter duration compared to other heating methods, while at the same time ensuring higher precision in delivering the thermal power (based on the product being processed).

Advantageously, heating by magnetic induction reduces heating transients, so the product being processed can be brought to the predetermined temperature more quickly.

In other words, this allows turning the heating in the machine 1 on and off very rapidly.

Advantageously, heating by magnetic induction allows ensuring high power density in systems that are particularly compact and reduced in size compared to traditional heating systems comprising a circuit and an evaporator with a heat exchanger fluid flowing in it.

In an embodiment, illustrated in FIG. 3, the mixing axis A is vertical and the wall 2A defines a bottom 2A' for the container 2; the induction element 6 is disposed outside the bottom 2A' of the container 2.

In an embodiment, illustrated in FIG. 2, the mixing axis A is horizontal and the wall 2A defines a rear 2A" for the container 2; the induction element 6 is disposed outside the rear 2A" of the processing container 2) and is opposite the outlet 3.

The induction element 6 may be a plain, single-winding inductor or a solenoid inductor.

In an embodiment, the induction element 6 is embodied in the form of a plate around which the conductors 7 are wound.

In an embodiment, the induction element 6 comprises a ferrite core.

In this embodiment, the conductors 7 are wound around the ferrite core.

In an embodiment, the conductors 7 are wound to form one or more coils.

The conductors 7 are electrical cables made from materials having low electrical resistivity, such as, for example, copper or steel.

The conductor 7, through the (alternating) electromagnetic field M, allows energy to be transferred through the walls of the container 2 to reach the stirrer 4.

When an electrically conductive component, for example, a ferromagnetic material such as, in this case, the portion 4A of the stirrer 4, is placed in the magnetic field M, it absorbs energy in the form of induced electrical current.

The induced electric current, also called eddy current, generates heat on the surface of the ferromagnetic portion 4A on account of the electrical resistance of the material (thereby obtaining what is called the Joule effect).

In other words, an electric current flows through the conductors 7 and generates the electromagnetic field M which is able to produce an induced electric current in the stirrer 4, which is converted into heat by the Joule effect.

Heating occurs in the ferromagnetic portion 4A of the stirrer 4.

Advantageously, a machine which uses magnetic induction heating is guaranteed to be particularly safe because the electromagnetic field affects only the ferromagnetic portion of the stirrer and remains limited to the surface of it.

Moreover, a machine which uses magnetic induction heating is extremely effective and efficient in that the heat conversion performance during heating is particularly high.

Advantageously, the walls (for example, the walls 2A, 2B) of the container 2 are not affected by the heating process and remain cold, thus avoiding the risk of localized burning of the food product inside the container. Indeed, it should be considered that the heating element, that is, the stirrer 4, is kept in rotation during heating: this prevents the product from sticking to it, thereby reducing or abating the risk of localized burning of the food product.

It is noted that the portion 4A of the stirrer 4, which is heated by magnetic induction through the magnetic field M, is immersed in the product to be thermally processed and thus causes the product to be heated.

Advantageously, the heat is produced directly inside the container 2 and there is no heat loss to the surrounding outside space.

Advantageously, heating by induction is a particularly high-performance and fast way of reaching the required heat intensity.

Advantageously, making thermal processes more efficient and rapid translates to energy saving, which allows a reduction in consumption.

Moreover, heating by induction is particularly precise and allows obtaining the required temperature profile.

The machine 1 comprises a control unit 10.

The control unit 10 is configured for controlling and driving the actuator 5.

Advantageously, the control unit 10 allows thermal treatment processes to be automated.

Advantageously, automating the processes facilitates the repeatability of the thermal process cycles.

The control unit 10 is configured to start the induction element 6 and the actuator 5 simultaneously to set the stirrer 4 in rotation while it is being heated.

Advantageously, heating and simultaneously moving the stirrer 4 allows thermally processing the product uniformly and without the risk of overheating some parts of the container 2 and burning the end product in contact with the overheated parts and thus spoiling the overall quality.

The machine 1 comprises an electrical power regulating unit 11.

The electrical power regulating unit 11 is driven by the control unit 10.

The unit 11 acts as a variable frequency voltage generator; it converts the fixed voltage of the mains power line to an alternating-current voltage at a required frequency.

The electrical power regulating unit 11 is connected to the induction element 6, specifically to supply electrical power to the conductors 7.

The electrical power regulating unit 11 is configured to supply power to the conductors 7 at a constant effective voltage.

The electrical power regulating unit 11 comprises an inverter 11A.

The inverter 11A is suitably configured for regulating the frequency of the voltage supplied to the conductors 7 as a function of the commands received from the control unit 10.

The inverter 11A therefore allows varying the power transfer by regulating the frequency of the supply voltage (which allows varying the current flowing through the conductors 7 of the induction element 6).

The electrical power regulating unit 11 comprises an ac-to-dc voltage conversion module 11B.

The conversion module 11B is connected to the mains power line by a connector 13.

The module 11B is connected to the input of the inverter 11A to supply dc voltage thereto.

The regulating unit 11 is configured to send electrical power to the conductors 7 according to a plurality of different power levels.

Advantageously, regulating the power according to different levels makes for machine precision and flexibility and ensures that the product is processed at the optimum temperature.

Advantageously, ensuring the optimum temperature is a particularly important aspect, especially for processes used to make bakery and confectionery products.

In an embodiment, the electrical power regulating unit 11 can provide power at between 5 and 30 levels, preferably between 10 and 20 levels.

According to an aspect, at least one of the power levels comprises transmitting power in pulsed mode.

In other words, at lower power levels, the system operates intermittently, turning the power supply on and off.

Advantageously, the pulsed mode further contributes to improving the energy efficiency of the machine.

In an embodiment, a number of power levels from 3 to 5 comprises levels in pulsed mode.

According to an aspect, at least one of the power levels comprises a booster mode.

Preferably, the booster mode is operational at the last power level.

The booster mode is an operating mode which allows the induction element 6 to absorb the maximum power it is rated for (preferably between 2 kW and 9 kW) for a predetermined time interval.

In an embodiment, the machine 1 comprises a user interface 12 connected to the control unit 10.

The user interface 12 is configured to allow selecting one of the power levels.

The user interface 12 is thus provided with controls (physical or touch buttons or selectors) to allow selecting the power levels.

In an embodiment, the machine 1 comprises a first temperature sensor 32, located inside the container 2, in communication with the control unit 10.

Advantageously, having a sensor 32 inside the container 2 makes it possible to measure the temperature of the product being processed.

In an embodiment, the machine 1 comprises a second temperature sensor 34, located on the stirrer 4, in communication with the control unit 10.

Advantageously, having a sensor 34 on the stirrer 4 allows measuring the temperature of the stirrer, hence sensing the state of the induction element 6 and thereby obtaining a measure of the intensity of the induction heating that is taking place.

Advantageously, having both the sensor 32 and the sensor 34 allows overall control of the thermal process in progress and makes it possible to obtain a measure of the power transfer between the induction element 6 and the stirrer 4 so as to obtain the required temperature profile for the product being processed.

In an embodiment, illustrated for example in FIG. 2 or 3, the machine 1 comprises a refrigeration system 15 that is provided with a closed circuit 16 configured to cause a heat exchanger fluid to circulate.

The refrigeration system 15 is optional and its presence allows cooling the food product being processed in the container 2.

Advantageously, it is possible to alternate cycles in which the product is heated (by induction) with cycles in which the product is cooled (by starting the refrigeration system).

Preferably, the refrigeration system 15 comprises an evaporator 17, a compressor 18, a condenser 19 and a throttle element 20.

The refrigeration system 15, specifically the compressor 18, is started and controlled by the control unit 10.

The evaporator 17, associated with the container 2, preferably comprises a coil which facilitates heat exchange between the heat exchanger fluid and the container 2.

The throttle element 20 is defined by at least one valve or at least one narrow portion of the circuit 16, configured for generating head losses in the heat exchanger fluid reducing the pressure.

The condenser 19 is preferably an air-cooled condenser.

The heat exchanger fluid flows through the compressor 18, the evaporator 17, the throttle element 20 and the condenser 19, in that order.

This disclosure also has for an object a method for processing a liquid or semi-liquid food product, comprising a step of providing a machine 1 according to at least one of the aforementioned features.

The method comprises at least:

a step of causing alternating electric current to flow in the conductors 7;

a step of generating a magnetic field M which passes through a wall of the container 2;

a step of heating the stirrer 4 with currents generated by the magnetic field M so as to heat the liquid or semi-liquid food product by means of the stirrer 4.

Advantageously, heating by magnetic induction provides optimum control of the temperature at which the process is carried out.

Advantageously, controlling the temperature and making heating uniform enhances the quality of the end product.

The method comprises a step of driving the stirrer 4 simultaneously with the step of heating the stirrer 4.

Advantageously, heating the product and moving the stirrer simultaneously allows thermally processing the product uniformly and without the risk of overheating some parts of the container and burning the end product in contact with the overheated parts and thus spoiling the overall quality.

In an embodiment, the step of generating a magnetic field which flows through a wall of the container 2 comprises a step of generating a pulsed magnetic field.

Advantageously, the pulsed mode further contributes to improving the energy efficiency of the machine.

Advantageously, making the processes more effective and reducing their power consumption allows reducing the environmental impact connected therewith.

What is claimed is:

1. A machine for processing liquid or semi-liquid food products, comprising:

a processing container for processing the liquid or semi-liquid food products and including walls and an outlet;

a stirrer, made at least partly from ferromagnetic material and disposed inside the processing container, the stirrer rotating about a mixing axis to mix the product to be dispensed;

an actuator connected to the stirrer to set the stirrer in rotation about the mixing axis, an induction element comprising one or more wound conductors for generating a magnetic field when an electric current flows through the one or more conductors, the induction element being disposed outside the processing container so that the magnetic field generated passes through at least part of the walls of the processing container to reach the stirrer and causes heating by magnetic induction, a control unit and an electrical power regulating unit driven by the control unit and connected to the induction element to provide the conductors with electrical power, wherein the electrical power regulating unit comprises an inverter configured to regulate a frequency of the electrical voltage to allow varying of power transfer to the conductors as a function of the commands received from the control unit.

2. The machine according to claim 1, wherein the mixing axis is vertical and the induction element is disposed outside a bottom of the processing container.

3. The machine according to claim 1, wherein the mixing axis is horizontal and the induction element is disposed outside a rear of the processing container, opposite the outlet.

4. The machine according to claim 1, wherein the stirrer comprises a first portion, which is made from a first, ferromagnetic material, and a second portion, which is made from a different material.

5. The machine according to claim 4, wherein the first portion of the stirrer is made at least partly from ferritic steel.

6. The machine according to claim 4, wherein the first portion of the stirrer has an austenitic steel coating.

7. The machine according to claim 1, wherein the induction element is configured as a plate.

8. The machine according to claim 1, wherein the power regulating unit comprises an ac to dc voltage conversion module that is connected to an input of the inverter to supply dc voltage thereto.

9. The machine according to claim 1, wherein the electrical power regulating unit is configured to supply power to the conductors at a constant effective voltage.

10. The machine according to claim 1, wherein the power regulating unit is configured to send electrical power to the conductors according to a plurality of different power levels, at least one of the power levels comprising the transmission of power in a pulsed mode.

11. The machine according to claim 10, wherein at least one of the power levels comprises a booster mode.

12. The machine according to claim 10, and further comprising a user interface that is connected to the control unit and configured to allow selecting one of the power levels.

13. The machine according to claim 1, and further comprising a refrigeration system that includes a closed circuit configured to cause a heat exchanger fluid to flow through a compressor, an evaporator thermally connected with the processing container, a throttle element and a condenser, in that order.

14. A method for treating a liquid or semi-liquid food product, comprising:

providing a machine for processing liquid or semi-liquid food products, comprising:

a processing container for processing the liquid or semi-liquid food products and including walls and an outlet;

a stirrer, made at least partly from ferromagnetic material and disposed inside the processing container, the stirrer rotating about a mixing axis to mix the product to be dispensed;

an actuator connected to the stirrer to set the stirrer in rotation about the mixing axis, an induction element comprising one or more wound conductors for generating a magnetic field when an electric current flows through the one or more conductors, the induction element being disposed outside the processing container so that the magnetic field generated passes through at least part of the walls of the processing container to reach the stirrer and causes heating by magnetic induction, a control unit and an electrical power regulating unit driven by the control unit and connected to the induction element to provide the conductors with electrical power, wherein the electrical power regulating unit comprises an inverter configured to regulate a frequency of the electrical voltage to allow varying of power transfer to the conductors as a function of the commands received from the control unit:

causing alternating electric current to flow in the conductors;

generating a magnetic field which passes through a wall of the processing container;

heating the stirrer with currents generated by the magnetic field to heat the liquid or semi-liquid food product with the stirrer.

15. The method according to claim 14, and further comprising a step of driving the stirrer simultaneously with the step of heating the stirrer.

16. The method according to claim 14, wherein the step of generating a magnetic field which flows through a wall of the processing container comprises a step of generating a pulsed magnetic field.

* * * * *